United States Patent
Jiang et al.

(10) Patent No.: US 11,349,115 B2
(45) Date of Patent: May 31, 2022

(54) SOLVENT SYSTEMS FOR USE IN LITHIUM ION BATTERY PRODUCTION

(71) Applicants: Dow Global Technologies LLC, Midland, MI (US); Dow Chemical Korea Limited, Seoul (KR)

(72) Inventors: Xin Jiang, Shanghai (CN); Qi Jiang, Shanghai (CN); Hua Ren, Shanghai (CN); Jianhai Mu, Shanghai (CN); Eungkyu Kim, Midland, MI (US); Kaoru Ohba, Tokyo (JP); Jong-Cheol Kim, Seoul (KR)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/050,101

(22) PCT Filed: Apr. 27, 2018

(86) PCT No.: PCT/CN2018/084773
§ 371 (c)(1),
(2) Date: Oct. 23, 2020

(87) PCT Pub. No.: WO2019/205080
PCT Pub. Date: Oct. 31, 2019

(65) Prior Publication Data
US 2021/0083266 A1    Mar. 18, 2021

(51) Int. Cl.
*H01M 4/139* (2010.01)
*H01M 4/62* (2006.01)
(Continued)

(52) U.S. Cl.
CPC ............ *H01M 4/139* (2013.01); *H01M 4/02* (2013.01); *H01M 4/04* (2013.01); *H01M 4/131* (2013.01); *H01M 4/1391* (2013.01); *H01M 4/62* (2013.01); *H01M 4/623* (2013.01); *H01M 4/625* (2013.01); *H01M 10/0525* (2013.01); *Y02E 60/10* (2013.01)

(58) Field of Classification Search
None
See application file for complete search history.

(56) References Cited

U.S. PATENT DOCUMENTS

| 5,085,954 A | 2/1992 | Kita et al. |
| 5,532,077 A | 7/1996 | Chu et al. |

(Continued)

FOREIGN PATENT DOCUMENTS

| CN | 101752548 A | 6/2010 |
| CN | 101757875 A | 6/2010 |

(Continued)

OTHER PUBLICATIONS

English machine translation of Jiaxi et al. (CN 101752548 A) Description and Claims, accessed online from Espacenet website, copy attached as a PDF, pp. 1-25. (Year: 2010).*

*Primary Examiner* — Katie L. Hammer
(74) *Attorney, Agent, or Firm* — Quarles & Brady LLP

(57) ABSTRACT

In the process of producing a lithium ion battery, one or more compounds of Formula 1, 2, 3 or 4 (e.g., N,N-dimethylpropionamide), is used as the solvent in the step of forming a slurry from an active material (e.g., lithium cobalt oxide), a conductive agent (e.g., carbon black), and a binder polymer (e.g., polyvinylidene fluoride).

18 Claims, 1 Drawing Sheet

(51) Int. Cl.
*H01M 10/0525* (2010.01)
*H01M 4/131* (2010.01)
*H01M 4/1391* (2010.01)
*H01M 4/04* (2006.01)
*H01M 4/02* (2006.01)

(56) References Cited

U.S. PATENT DOCUMENTS

| | | |
|---|---|---|
| 5,686,201 A | 11/1997 | Chu |
| 5,952,126 A | 9/1999 | Lee et al. |
| 5,965,300 A | 10/1999 | Lee et al. |
| 6,030,720 A | 2/2000 | Chu et al. |
| 6,225,002 B1 | 5/2001 | Nimon et al. |
| 6,358,643 B1 | 3/2002 | Katz et al. |
| 6,632,573 B1 | 10/2003 | Nimon et al. |
| 6,908,711 B2 | 6/2005 | Fauteux et al. |
| 7,250,233 B2 | 7/2007 | Choi et al. |
| 7,422,826 B2 | 9/2008 | Xing et al. |
| 7,476,463 B2 | 1/2009 | Desilvestro et al. |
| 8,715,865 B2 | 5/2014 | Xu et al. |
| 8,764,853 B2 | 7/2014 | Xu et al. |
| 2003/0104282 A1 | 6/2003 | Xing et al. |
| 2013/0095395 A1 | 4/2013 | Sanchez-Carrera et al. |
| 2014/0248544 A1 | 9/2014 | Xing et al. |
| 2014/0255802 A1* | 9/2014 | Barde ............... H01M 12/06 |
| | | 429/405 |
| 2014/0312268 A1 | 10/2014 | Lim |
| 2014/0370382 A1 | 12/2014 | Lim |
| 2015/0140446 A1 | 5/2015 | Li |
| 2017/0226365 A1 | 8/2017 | Kobayashi et al. |
| 2017/0373284 A1* | 12/2017 | Durstock ............ H01M 4/525 |
| 2020/0395612 A1 | 12/2020 | Xie et al. |

FOREIGN PATENT DOCUMENTS

| | | |
|---|---|---|
| CN | 104362330 A | 2/2015 |
| CN | 104779368 A | 7/2015 |
| CN | 103000851 B | 8/2015 |
| CN | 105006594 A | 10/2015 |
| CN | 105018801 A | 11/2015 |
| CN | 105024097 A | 11/2015 |
| CN | 105062219 A | 11/2015 |
| CN | 105895870 A | 8/2016 |
| CN | 106207094 A | 12/2016 |
| JP | 2014-78416 A | 5/2014 |
| JP | 5877112 B2 | 3/2016 |
| KR | 10-2010-0118808 A | 11/2010 |
| KR | 10-2012-0057179 A | 6/2012 |
| WO | WO-2016031562 A1 * | 3/2016 ............ H01G 11/70 |

\* cited by examiner

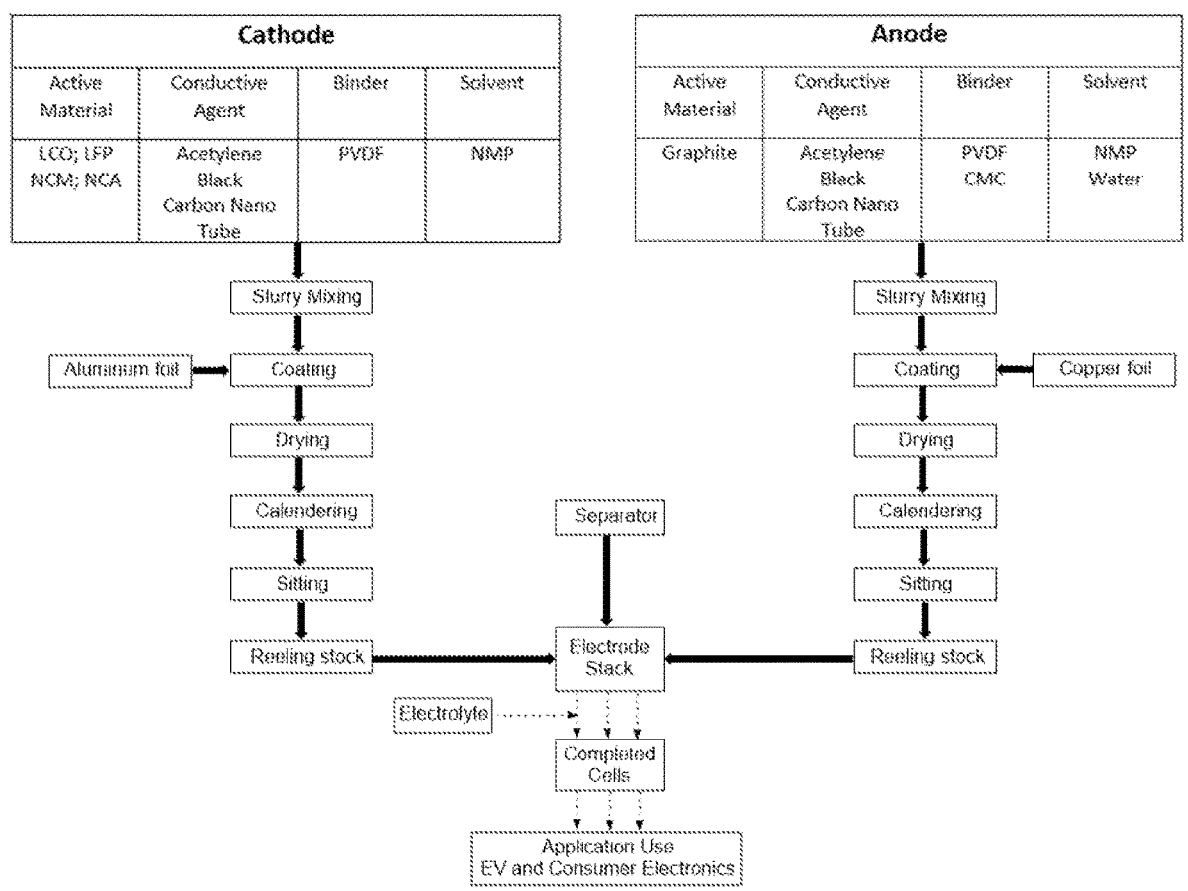

SOLVENT SYSTEMS FOR USE IN LITHIUM ION BATTERY PRODUCTION

FIELD

The present disclosure relates to ecology-friendly solvents ("eco-solvents") useful in the manufacture of rechargeable, also known as secondary, batteries, e.g., lithium ion batteries.

BACKGROUND

The significant growth of electrical vehicles and portable electronic devices has led to an increase in the demand for rechargeable batteries, especially the various types of lithium ion batteries. Modern trends of small size and light weight require that these rechargeable batteries have not only a high energy density, but are also environmentally friendly. The eco-friendly requirements apply not only to the battery product itself, but also to the production process by which it is made.

N-methyl-2-pyrrolidone (NMP) is currently the solvent of choice for use in the production of lithium ion batteries. NMP is used in the step of the process in which a slurry is made from an active material (e.g., lithium cobalt oxide), a conductive agent (e.g., carbon black), and a binder polymer (e.g., polyvinylidene fluoride (PVDF)). NMP dissolves the PVDF, and the resulting solution is used to slurry the active material and conductive agent. NMP readily dissolves PVDF, and it has low volatility and flashpoint, thermal stability, high polarity, and aprotic, noncorrosive properties. However, in addition to its toxicity issues, NMP has a high boiling point, and this results in the need for a relatively high temperature to remove it completely from the slurry by evaporation once the slurry has been applied to a cathode or anode foil. Even a small amount of NMP residue left in the final battery product may cause a safety issue if the battery is used in a consumer device such as an electrical vehicle or cell phone).

SUMMARY

In one embodiment a process of making a lithium ion battery cathode or anode is provided, the process comprising the step of forming a slurry of an active material, a conductive agent, a binder polymer and a solvent, the solvent consisting essentially of one or more of a first compound of Formula 1

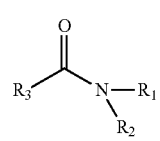

(1)

in which $R_1$ and $R_2$ are hydrogen or a C1-4 straight or branched chain alkyl or alkoxy, and $R_3$ is a C1-10 straight or branched chain alkyl or alkoxy, with the proviso that $R_1$ and $R_2$ are not both hydrogen; or one or more of a second compound of Formula 2

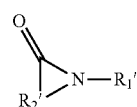

(2)

in which $R_2'$ is 2-9 ring carbon atoms each of which can have a C1-2 alkyl or alkoxy branch, and $R_1'$ is a C2-8 straight or branched chain alkyl or alkoxy; or
one or more of a third compound of Formula 3

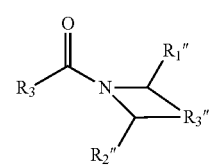

(3)

in which $R_1''$ and $R_2''$ are hydrogen or a C1-2 alkyl or alkoxy; $R_3''$ is 2-4 ring carbons each of which can have a C1-2 alkyl or alkoxy branch; and Ra" is hydrogen or a C1-3 straight or branched chain alkyl or alkoxy, or
one or more of a fourth compound of Formula 4

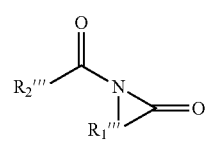

(4)

in which $R_1'''$ is 5-9 ring carbons each of which can have a C1-2 alkyl or alkoxy branch; and $R_2'''$ is hydrogen or a C1-3 straight or branched chain alkyl or alkoxy.

BRIEF DESCRIPTION OF THE FIGURE

The FIGURE is a block flow diagram describing a conventional production process for making a lithium ion battery in which NMP is used as the solvent in the formation of cathode and anode slurries from an active material, conductive agent and binder.

DETAILED DESCRIPTION

Definitions

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 to 7), any subrange between any two explicit values is included (e.g., 1 to 2; 2 to 6; 5 to 7; 3 to 7; 5 to 6; etc.).

"Active material" and like terms mean, as used in the context of a lithium ion battery, a substance that is either the source of lithium ions or that can receive and accept lithium ions. In the context of the cathode of a lithium ion cell, the active material is the source of the lithium ions, e.g., lithium cobalt oxide, lithium manganese oxide, etc. In the context of the anode of a lithium ion cell, the active material is the receptor of the lithium ions, e.g., graphite. The active materials are typically in the form of very small particles having a diameter from 100 nanometers to 100 micrometers.

"Alkoxy" refers to the —$OZ^1$ radical, where representative $Z^1$ include alkyl, substituted alkyl, cycloalkyl, substituted cycloalkyl, heterocycloalkyl, substituted heterocycloalkyl, silyl groups and combinations thereof. Suitable alkoxy radicals include, for example, methoxy, ethoxy, benzyloxy, t-butoxy, etc. A related term is "aryloxy" where representative $Z^1$ include aryl, substituted aryl, heteroaryl, substituted heteroaryl, and combinations thereof. Examples of suitable aryloxy radicals include phenoxy, substituted phenoxy, 2-pyridinoxy, 8-quinalinoxy and the like.

"Alkyl" refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one embodiment, the alkyls have 1 to 20 carbon atoms.

"Anode" and like terms, as used in the context of a lithium ion battery, mean the negative electrode in the discharge cycle. The anode is the electrode where oxidation takes place within the battery during discharge, i.e., electrons are freed and flow out of the battery.

"Battery" and like terms mean a collection of cells or cell assemblies which are ready for use. A battery typically contains an appropriate housing, electrical interconnections, and, possibly, electronics to control and protect the cells from failure, e.g., fire, thermal runaway, explosion, loss of charge, etc. The simplest battery is a single cell. Batteries can be primary, i.e., non-rechargeable, and secondary, i.e., rechargeable.

"Binder polymers" and like terms mean, as used in the context of a lithium ion battery, a polymer that holds the active material particles within an electrode of a lithium-ion battery together to maintain a strong connection between the electrode and the contacts. Binder polymers are normally inert to the substances in which they are in contact within the lithium ion battery during discharging, charging and storage.

"Cathode" and like terms, as used in the context of a lithium ion battery, mean the positive electrode in the discharge cycle. The lithium in a lithium ion battery is in the cathode. The cathode is the electrode where reduction takes place within the battery during discharge.

"Cell" and like terms mean a basic electrochemical unit that contains the electrodes, separator, and electrolyte.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary.

"Conductive agent" and like terms mean, as used in the context of a lithium ion battery, a substance that promotes the flow of ions between the electrodes of a cell. Carbon-based compounds and materials, e.g., acetylene black, carbon nano-tubes, carbon-based polymers, and the like, are typical conductive agents used in lithium ion batteries.

In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Electrolyte" and like terms mean, as used in the context of a lithium ion battery, a substance that carries positively charged lithium ions from the anode to the cathode, and vice versa, through a separator.

Unless stated to the contrary, implicit from the context, or customary in the art, all parts and percents are based on weight and all test methods are current as of the filing date of this disclosure.

"Lithium ion battery" and like terms mean a rechargeable (i.e., a secondary) battery in which lithium ions move from the negative electrode to the positive electrode during discharge and back when charging. Lithium ion batteries use an intercalated lithium compound as one electrode material as opposed to the metallic lithium used in a non-rechargeable lithium battery (also known as a primary battery). The electrolyte, which allows for ionic movement, and the two electrodes are the constituent components of a lithium-ion battery cell.

"Separator" and like terms mean, as used in the context of a lithium ion battery, a thin, porous membrane that physically separates the anode and cathode. The primary function of the separator is to prevent physical contact between the anode and cathode, while facilitating lithium ion transport within the cell. Separators are typically a simple plastic film, e.g., polyethylene or polypropylene, or a ceramic, with a pore size designed to allow lithium ion transit.

"Solvent" and like terms mean a substance that is capable of dissolving another substance (i.e., a solute) to form an essentially uniformly dispersed mixture (i.e., solution) at the molecular or ionic size level.

Production Process for Lithium Ion Battery

FIG. 1 shows a conventional production process flow diagram for a lithium ion battery in which NMP is used as a solvent. NMP is used as the solvent to dissolve binder polymers like polyvinylidene fluoride (PVDF) which is then used to form a slurry of conductive agent, active material and other additives. Alternative binder polymers include but are not limited to cellulose and styene butadiene rubber (SBR) graphene and/or fullerene. Conductive agents include but are not limited to carbon black, carbon nano tubes. Active materials include but are not limited to lithium cobalt oxide ($LiCoO_2$), lithium manganese oxide ($LiMn_2O_4$), lithium nickel manganese cobalt oxide ($LiNiMnCoO_2$ or NMC), lithium iron phosphate ($LiFePO_4$), lithium nickel cobalt aluminum oxide ($LiNiCoAlO_2$), and lithium titanate ($Li_4TisO_{12}$). The slurry is then coated onto a foil, typically aluminum for the cathode and copper for the anode, and the coated foil then dried.

In the drying process (typically in an oven), NMP is evaporated without residue, and the dried foil comprises a fine film having a thickness from 50 to 200 micrometers and that includes a solid component which is the dried slurry comprising the binder polymers, conductive agent, active material and other additives. The dried foil is then calendared in a calendar machine allowed to set, and then collected on a reel. Eventually the cathode and anode films are combined into an electrode stack and the cell is completed with the addition of electrolyte.

Solvents

The solvents used in the practice of the present disclosure are replacement solvents for NMP in lithium ion battery production processes such as shown in FIG. 1. These solvents consist of, or consist essentially of, one or more of a compound of Formula 1, 2, 3 or 4 as described further herein. In one embodiment the solvent consists of only one of any compound of Formula 1, 2, 3 or 4. In one embodiment the solvent consists of a mixture of any two compounds of Formula 1, 2, 3 or 4. In one embodiment the solvent consists of a mixture any three compounds of Formula 1, 2, 3 or 4. In one embodiment the solvent consists of a mixture of all four compounds of Formula 1, 2, 3 or 4. In those embodiments in which the solvent consists of a mixture of 2 or more compounds of Formula 1, 2, 3 or 4, the amount of any one of the compounds in the mixture can range from 1 to 99, or 10 to 90, or 20 to 80, or 30 to 70, or 40 to 60, weight percent (wt %) of the weight of the mixture. In one embodiment each solvent in the mixture of solvents is present in an amount within 20, or 15, or 10, or 5, or 3, or 1, wt % of each of the other solvents in the mixture.

In one embodiment the solvent used in the practice of embodiments of the present disclosure consists of a compound of Formula 1

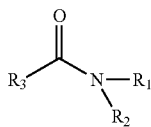

(1)

in which $R_1$ and $R_2$ are hydrogen or a C1-4 straight or branched chain alkyl or alkoxy, and $R^3$ is a C1-10 straight or branched chain alkyl or alkoxy, with the proviso that $R_1$ and $R_2$ are not both hydrogen.

In one embodiment the solvent used consists of two or more compounds of Formula 1. In one embodiment the solvent of Formula 1 is one or more of N,N-dimethylpropionamide (DMPA); N,N-diethylpropionamide; N,N-dipropylpropionamide; N,N-dibutylpropionamide; N,N-dimethylethylpropionamide; and 3-butoxy-N-methyl propionamide. In one embodiment the solvent of Formula 1 is DMPA.

In one embodiment the solvent used in the practice of embodiments of the present disclosure consists of a compound of Formula 2

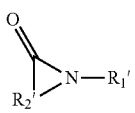

(2)

in which $R_2'$ is 2-9 ring carbon atoms each of which can have a C1-2 alkyl or alkoxy branch, and $R_1'$ is a C2-8 straight or branched chain alkyl or alkoxy.

In one embodiment the solvent used consists of two or more compounds of Formula 2. In one embodiment the solvent of Formula 2 is one or more of N,N-diethyl acetamide (DEAC) and N-ethyl-ε-caprolactam. In one embodiment the solvent of Formula 2 is DEAC.

In one embodiment the solvent used in the practice of embodiments of the present disclosure consists of a compound of Formula 3

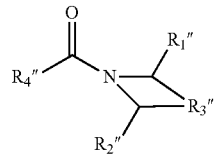

(3)

in which $R_1''$ and $R_2''$ are hydrogen or a C1-2 alkyl or alkoxy; $R_3''$ is 2-4 ring carbons each of which can have a C1-2 alkyl or alkoxy branch; and $R_4''$ is hydrogen or a C1-3 straight or branched chain alkyl or alkoxy.

In one embodiment the solvent used consists of two or more compounds of Formula 3. In one embodiment the solvent of Formula 3 is one or more of 3-methoxy-N,N-dimethyl propionamide (M3DMPA) and N-acetyl morpholine. In one embodiment the solvent of Formula 3 is M3DMPA.

In one embodiment the solvent used in the practice of embodiments of the present disclosure consists of a compound of Formula 4

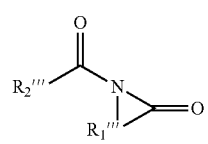

(4)

in which $R_1'''$ is 5-9 ring carbons each of which can have a C1-2 alkyl or alkoxy branch; and $R_2'''$ is hydrogen or a C1-3 straight or branched chain alkyl or alkoxy.

In one embodiment the solvent used consists of two or more compounds of Formula 4. In one embodiment the solvent of Formula 4 is one or more of N,N-dimethylbutyramide (DMAA) and N-propionyl-ε-caprolactam. In one embodiment the solvent of Formula 4 is DMAA.

The individual solvents used in the practice of embodiments of the present disclosure are known compounds, liquid at ambient conditions (23° C. and atmospheric pressure), and generally commercially available. To form a mixture of two or more solvents of any of Formula 1, 2, 3 or 4, or of two or more solvents of Formula 1, 2, 3 or 4, the individual solvents can simply be mixed with one another using conventional mixing equipment and standard blending protocols. The individual solvents can be added to one another in any order including simultaneously.

The solvents are eco-solvents, i.e., they do not have, or have at a reduced level, the toxicology issues associated with NMP. In one embodiment, the solvents are intended as a replacement for NMP in the production process for lithium ion batteries. As such, they are used in the same manner as NMP is used in such processes (e.g., such as the process shown in FIG. 1). Typically, this process includes the steps of dissolving a binder with the solvent, and then forming a slurry from the dissolved binder, an active material and a conductive agent. The slurry is then applied to a foil, and the foil dried during which the solvent is removed by evaporation.

The solvents used in the practice of embodiments of the present disclosure include, but are not limited to, N,N-dimethylpropionamide (DMPA), N,N-diethyl acetamide (DEAC), 3-methoxy-N,N-dimethylpropionamide (M3DMPA), N,N-dimethylbutyramide (DMAA) and/or their mixtures. These solvents can dissolve the binder polymer faster than NMP, which, in turn, can improve the production efficiency of the batteries. The binder polymer solutions based on the solvents used in the practice of embodiments of the present disclosure also show a lower viscosity than the binder polymer solutions based on NMP, which, in turn, also improves the production efficiency of the batteries. Moreover, many of the solvents used in accordance with embodiments of the present disclosure have lower boiling points and higher evaporation rates than NMP which means that they can be evaporated faster with lower energy consumption and leave less residue. As NMP is typically recycled, the solvents used in the practice of embodiments of the present disclosure are easier to recycle due to their lower boiling point and higher evaporation rate, an overall cost saving for the battery production process.

By way of example, and not limitation, some embodiments of the present disclosure will now be described in detail in the following Examples.

EXAMPLES

Materials

The binder polymer was KUREHA™ 7200, a polyvinylidene fluoride (PVDF) available from Kureha.

The solvents were N-methyl-2-pyrrolidone (Sinopharma, 99%), N,N-diethyl acetamide (Xinxing Chemical, 99.5%), 3-methoxy-N,N-dimethyl propionamide (Tianhua Pharmaceutical, 98%) and N, N-dimethylpropionamide (XIngxin, 99.5%).

Test Procedure 95 grams (g) of comparative or inventive solvent samples are placed in separate beakers and heated to 60° C. 5 g of PVDF powder are weighed and added to the individual heated solvents. The mix of solvent and PVDF is stirred at 60° C. in the beakers and the time recorded when the PVDF is thoroughly dissolved in the solvent. The PVDF solution is then tested with a Brookfield viscosity meter (no. #62 spindle). The results are reported in Table 1.

TABLE 1

PVDF Solvency Test Results

| | Comparative Example | Inventive Example 1 | Inventive Example 2 | Inventive Example 3 |
|---|---|---|---|---|
| Solvent | NMP | DMPA | DEAC | M3DMPA |
| Boiling Point, deg C. | 202 | 175 | 184 | 213 |
| Relative Evaporation Rate (n-butyl acetate = 1) | 0.015 | 0.1097 | 0.0605 | 0.016 |
| Time to dissolve 5% PVDF at 60 deg C., mins | 270 | 150 | 330 | 150 |
| Viscosity of PVDF solution, cP (#62, 50 rpm) | 1500 | 440 | 220 | 405 |

Inventive samples DMPA and M3DMPA show faster dissolving speed for the binder PVDF, which may improve the production efficiency for battery production. Compared with NMP, the inventive solvents also show much lower viscosity after dissolving PVDF. The battery producers can reduce the solvent usage level in the slurry formulation, which can save the production cost. The inventive samples (except M3DMPA) have lower boiling points and higher evaporation rates than NMP and as such, they can be evaporated at a lower temperature during the drying process. They can also be recycled with lower energy consumption which means a cost saving for the production process.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A process of making a lithium ion battery cathode or anode, the process comprising the steps of:
    forming a slurry consisting of an active material, a conductive agent, a binder polymer that is polyvinylidene fluoride, and a solvent, the solvent consisting of one or more of a first compound of Formula 1

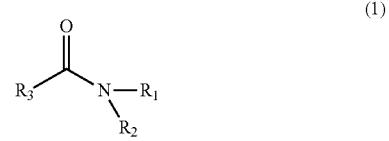

(1)

in which $R_1$ and $R_2$ are hydrogen or a C1-4 straight or branched chain alkyl or alkoxy, and $R_3$ is a C1-10 straight or branched chain alkyl or alkoxy, with the proviso that $R_1$ and $R_2$ are not both hydrogen; or
    one or more of a second compound of Formula 2

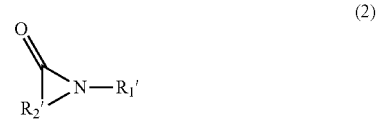

(2)

in which $R_2'$ is 2-9 ring carbon atoms each of which can have a C1-2 alkyl or alkoxy branch, and $R_1'$ is a C2-8 straight or branched chain alkyl or alkoxy; or
    one or more of a third compound of Formula 3

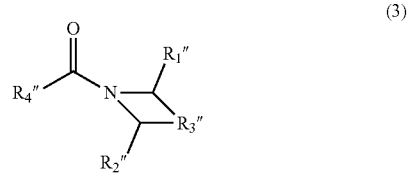

(3)

in which $R_1''$ and $R_2''$ are hydrogen or a C1-2 alkyl or alkoxy; $R_3''$ is 2-4 ring carbons each of which can have a C1-2 alkyl or alkoxy branch; and $R_4''$ is hydrogen or a C1-3 straight or branched chain alkyl or alkoxy, or
    one or more of a fourth compound of Formula 4

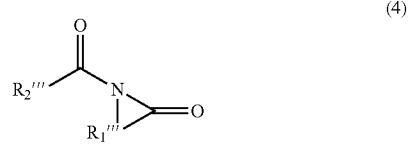

(4)

in which $R_1''$ is 5-9 ring carbons each of which can have a C1-2 alkyl or alkoxy branch; and $R_2'''$ is hydrogen or a C1-3 straight or branched chain alkyl or alkoxy; and applying the slurry to a foil.

2. The process of claim 1 in which the solvent consists of a compound of Formula 1.

3. The process of claim 2 in which the solvent is N,N-dimethylpropionamide.

4. The process of claim 1 in which the solvent consists of a compound of Formula 2.

5. The process of claim 4 in which the solvent is N,N-diethyl acetamide.

6. The process of claim 1 in which the solvent consists of a compound of Formula 3.

7. The process of claim 6 in which the solvent is 3-methoxy-N,N-dimethyl propionamide.

8. The process of claim 1 in which the solvent consists of a compound of Formula 4.

9. The process of claim 8 in which the solvent is N,N-dimethylbutyramide.

10. A cathode or anode comprising the foil made by the process of claim 1.

11. A lithium ion battery comprising the cathode or anode of claim 10.

12. The process of claim 1 wherein the solvent is selected from the group consisting of N,N-diethyl acetamide, 3-methoxy-N,N-dimethyl propionamide, and N, N-dimethylpropionamide.

13. A process of making a lithium ion battery cathode or anode, the process comprising:

forming a slurry consisting of (i) an active material, (ii) a conductive agent, (iii) a binder polymer selected from the group consisting of polyvinylidene fluoride, cellulose, and styrene butadiene rubber, and (iv) a solvent, the solvent selected from the group consisting of N,N-dimethylpropionamide (DMPA), N,N-diethylpropionamide, N,N-dipropylpropionamide, N,N-dibutylpropionamide, N,N-dimethylethylpropionamide, 3-butoxy-N-methyl propionamide, N,N-diethyl acetamide (DEAC), N-ethyl-ε-caprolactam, 3-methoxy-N,N-dimethyl propionamide (M3DMPA), N-acetyl morpholine, N,N-dimethylbutyramide (DMAA), N-propionyl-ε-caprolactam, and combinations thereof; and applying the slurry to a foil.

14. The process of claim 13 wherein the binder polymer is polyvinylidene fluoride.

15. The process of claim 14 wherein the solvent is selected from the group consisting of N,N-diethyl acetamide, 3-methoxy-N,N-dimethyl propionamide (M3DMPA), N,N-dimethylpropionamide (DMPA), and combinations thereof.

16. The process of claim 15 wherein the solvent is N,N-diethyl acetamide.

17. The process of claim 15 wherein the solvent is 3-methoxy-N,N-dimethyl propionamide.

18. The process of claim 15 wherein the solvent is N, N-dimethylpropionamide.

* * * * *